(12) United States Patent
Egedal et al.

(10) Patent No.: US 11,378,487 B2
(45) Date of Patent: Jul. 5, 2022

(54) DETERMINING AT LEAST ONE CHARACTERISTIC OF A BOUNDARY LAYER OF A WIND TURBINE ROTOR BLADE

(71) Applicant: Siemens Gamesa Renewable Energy A/S, Brande (DK)

(72) Inventors: Per Egedal, Herning (DK); Peder Bay Enevoldsen, Vejle (DK); Moritz Fiedel, Hamburg (DE); Alejandro Gomez Gonzalez, Aarhus (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 239 days.

(21) Appl. No.: 16/630,046

(22) PCT Filed: Apr. 23, 2018

(86) PCT No.: PCT/EP2018/060315
§ 371 (c)(1),
(2) Date: Jan. 10, 2020

(87) PCT Pub. No.: WO2019/011489
PCT Pub. Date: Jan. 17, 2019

(65) Prior Publication Data
US 2020/0166429 A1 May 28, 2020

(30) Foreign Application Priority Data
Jul. 14, 2017 (DE) ...................... 10 2017 212 121.1

(51) Int. Cl.
*F03D 17/00* (2016.01)
*G01M 9/06* (2006.01)
(Continued)

(52) U.S. Cl.
CPC ............. *G01M 9/065* (2013.01); *F03D 17/00* (2016.05); *G01B 7/18* (2013.01); *G01B 7/22* (2013.01); *G01B 7/24* (2013.01)

(58) Field of Classification Search
None
See application file for complete search history.

(56) References Cited

U.S. PATENT DOCUMENTS 4,455,877 A * 6/1984 Blechinger ........... G01F 1/3209
73/861.22
5,191,791 A * 3/1993 Gerardi .................. B64D 15/16
73/178 R
(Continued)

FOREIGN PATENT DOCUMENTS

CA 2820486 A1 12/2013
CN 101334004 A 12/2008
(Continued)

OTHER PUBLICATIONS

Non-English Chinese Office Action for Application No. 201880047020.0, dated Aug. 13, 2020.
(Continued)

*Primary Examiner* — Herbert K Roberts
(74) *Attorney, Agent, or Firm* — Schmeiser, Olsen & Watts LLP

(57) ABSTRACT

Provided is a method for determining at least one characteristic of a boundary layer a wind turbine rotor blade, including capturing at least one movement of at least one flexible element of at least one sensor being attached to or being part of a surface of the rotor blade, determining the at least one characteristic of the boundary layer based on the at least one captured movement of the at least one flexible element. Further, a sensor device, a wind turbine and a device as well as a computer program product and a com-
(Continued)

puter readable medium are suggested for performing the method.

6 Claims, 4 Drawing Sheets

(51) Int. Cl.
*G01B 7/16* (2006.01)
*G01B 7/24* (2006.01)

(56) References Cited

U.S. PATENT DOCUMENTS

| | | | |
|---|---|---|---|
| 7,909,576 B1 | 3/2011 | van der Bos et al. | |
| 9,841,000 B2 * | 12/2017 | Greenblatt | F03B 5/00 |
| 2008/0317598 A1 | 12/2008 | Barbu et al. | |
| 2010/0143129 A1 * | 6/2010 | Fisher | F03D 7/0256 416/61 |
| 2010/0158688 A1 * | 6/2010 | Benito | F03D 80/40 416/39 |
| 2011/0103933 A1 | 5/2011 | Olesen et al. | |
| 2012/0086209 A1 * | 4/2012 | Obrecht | F03D 17/00 290/55 |
| 2012/0119507 A1 * | 5/2012 | Tuttle | F03D 5/06 290/55 |
| 2012/0141271 A1 | 6/2012 | Southwick | |
| 2012/0165996 A1 | 6/2012 | Olesen | |
| 2012/0292915 A1 * | 11/2012 | Moon | F01D 5/06 290/55 |
| 2013/0022464 A1 | 1/2013 | Dixon et al. | |
| 2015/0071778 A1 * | 3/2015 | Delport | F03D 7/0224 416/1 |

FOREIGN PATENT DOCUMENTS

| | | | | |
|---|---|---|---|---|
| CN | 102046968 A | 5/2011 | | |
| CN | 102297074 A | 12/2011 | | |
| CN | 102483038 | 5/2012 | | |
| CN | 102889176 A | 1/2013 | | |
| CN | 102996331 A | 3/2013 | | |
| EP | 2180183 A1 | 4/2010 | | |
| EP | 2270312 A1 | 1/2011 | | |
| FR | 2957387 A1 | 9/2011 | | |
| GB | 2467295 A * | 7/2010 | | G01P 5/02 |
| GB | 2467295 A | 7/2010 | | |
| WO | 2016066170 A1 | 5/2016 | | |

OTHER PUBLICATIONS http://cortenergy.nl/NATURE.pdf Stall detection concept by use of flippable light reflectors.
http://dynonavionics.com/docs/SkyView_AoA.html http://www.evansaviationproducts.com/Other%20Products.htm Airfoil measurement devices for airplanes (standard pitot tubes).
International Search Report and Written Opinion of the International Searching Authority dated Aug. 9, 2018 for Application No. PCT/EP2018/060315.

* cited by examiner

DETERMINING AT LEAST ONE CHARACTERISTIC OF A BOUNDARY LAYER OF A WIND TURBINE ROTOR BLADE

CROSS-REFERENCE TO RELATED APPLICATIONS

This application claims priority to PCT Application No. PCT/EP2018/060315, having a filing date of Apr. 23, 2018, which is based off of DE Application No. 10 2017 212 121.1, having a filing date of Jul. 14, 2017, the entire contents both of which are hereby incorporated by reference.

FIELD OF TECHNOLOGY

The following relates to a method, a sensor device, a wind turbine and to a device for determining at least one characteristic of a boundary layer of a wind turbine rotor blade. In addition, a corresponding computer program product and a computer readable medium are provided.

BACKGROUND

A boundary layer of a wind turbine blade like, e.g., the boundary layer of an airfoil section of a wind turbine blade is an air flow region very close to a surface of the rotor blade wherein, e.g., a velocity of the air flow is reduced from a free flow velocity down to a velocity value of approximately zero directly at the surface.

A characteristic or quality of the boundary layer may be defined or represented by properties of the air flow or at least a part of the air flow characterizing the boundary layer. Such air flow characteristics may be, e.g., an air flow velocity and/or an air flow direction.

Thereby, a thickness of the boundary as a further characteristic of the boundary layer may be defined as the height perpendicular to the surface of the rotor blade at which the air flow velocity reaches a value of about, e.g., 99% of the free air flow velocity.

Other properties may be used as well to characterize the boundary layer like, e.g., a so-called displacement thickness or momentum thickness, both being related to a reduction of mass flow and momentum within the boundary layer respectively.

Furthermore, the boundary layer may be also characterized or defined by a gradient of wind speed at different positions within the boundary layer. Such gradient may be represented by a wind speed profile defining, e.g., a slope of an air flow velocity within that boundary layer.

At present it is difficult to determine one or more characteristics of the boundary layer. As an example, specific sensors are required which have to be placed in the air flow outside of the rotor blade to determine the air flow characteristic.

SUMMARY

An aspect relates to overcome the aforementioned disadvantages and in particular to provide an improved approach for determining boundary layer characteristics.

In order to overcome this problem, a method is provided for determining at least one characteristic of a boundary layer of a wind turbine rotor blade, comprising capturing at least one movement of at least one flexible element of at least one sensor being attached to or being part of a surface of the rotor blade, determining the at least one characteristic of the boundary layer based on the at least one captured movement of the at least one flexible element.

Flexible element may be any element of a sensor comprising at least partly a flexible body being arranged in such a way to react specifically or individually upon impinging air flows with different air flow velocities resulting in different aerodynamic forces. Such kind of reaction caused by aerodynamic forces may be a movement or several movements of the flexible element like, e.g., a deflection, a bending or a vibration of the flexible element triggered by the aerodynamic forces.

The sensor may be arranged such within the boundary layer of the rotor blade that the at least one flexible element is in operative connection with an impinging air flow.

Depending on the thickness of the boundary layer the velocity of the air flow at a position close to the surface of the rotor blade may be higher or lower. Thereby, a thin boundary layer (usually indicating a clean rotor blade or a low angle of attack or a combination of both) results in a high air flow velocity close to the surface of the rotor blade which might be similar to the free air flow velocity. In contrast, in case of a think boundary layer (which might indicate a dirty blade or a high angle of attack or a combination thereof) the air flow velocity close to the surface may be lower like, e.g., 30% or 50% of the free air flow velocity.

Movement of the flexible element may be a deflection or bending of the flexible element in e.g. horizontal and/or vertical direction (in relation to the surface of the rotor blade) caused by the impinging air flow at the surface of the rotating rotor blade during operation of the wind turbine.

Consequently, the flexible element being placed in the air flow will be more deflected or bent in case of thin boundary layer (characterized by a high air flow velocity and thus high aerodynamic forces) than in case of a thick boundary layer (characterized by a lower air flow velocity and thus low aerodynamic forces).

According to the proposed solution, a capturing of the movement of the flexible element like determining the deflection of the flexible element, e.g. by measuring a bending magnitude of the flexible element may be equal to an indirect measurement of the air flow velocity within the boundary layer allowing an easy and economical way of determining the characteristic of the boundary layer of a rotor blade.

An alternative kind of movement of the flexible element may be an oscillation or a vibration caused by the impinging air flow.

According to an exemplary embodiment of the present invention characteristic of boundary layer at the trailing edge or at other chordwise locations of one or more positions along a span of the rotor blade may be determined.

The sensor device is equipped with a measurement unit suitable for capturing the at least one movement of the least one flexible element. Further on the sensor device comprises a communication unit being adapted to provide at least one suitable information representing the at least one captured movement. Such movement information may be an analogous or digital signal, e.g., representing an amount or value of the captured movement.

The proposed solution is based on one or more sensors or sensor devices being assignable to at least one rotor blade. According to a further embodiment several sensor devices may be assigned to one rotor blade.

The assignable sensor may be a separate device which may be fixed, attached or mounted to the at least one rotor blade. Alternatively, the assignable sensor device may be a device being part of a structure of the at least one rotor blade, i.e. a device being implemented or integrated during a manufacturing process of the respective rotor blade.

The sensor may be an independent, self-powered device comprising several units representing different cooperating functionalities like, e.g. a measuring unit, a energy supply unit, a control unit and a wireless transmitter unit. Optionally further functionalities may be included in the sensor device.

In an embodiment, the at least one characteristic of the boundary layer is determined based on an air flow characteristic of the boundary layer.

In a next embodiment,
a deflection of the flexible element is determined on basis of the at least one captured movement, and
the least one air flow characteristic of the boundary layer is determined on basis of the determined deflection of the at least one flexible element.

In another embodiment the deflection of the flexible element is determined on basis of a measured bending magnitude of the at least one flexible element.

The deflection may be
substantially in a direction towards the air flow direction or
substantially perpendicular to the air flow direction.

In a further embodiment, the movement of the flexible element is determined by at least one out of the following:
use of a strain gauge sensor being attached to the flexible element;
embellishing the flexible element with a moving surface including a magnetic element and by using a magnetic detector to determine a position of the magnetic element;
providing the sensor with a capacitive sensor including a moving element on top of the surface of the capacitive sensor and by using a tomographic approach to determine a position of the flexible element;
providing the sensor with a conductive surface and a conductive element moving on top of the conductive surface and determining the deflection on basis of a measured change in resistivity;
providing the sensor with at least one optical fiber suitable to determine the deflection of the flexible element;
providing the sensor with a proximity sensor based on infrared.

In a next embodiment,
the at least one flexible element comprises a bluff body,
a vortex shedding frequency of the bluff body is determined on basis of the captured movement,
the air flow characteristic is determined on basis of the determined vortex shedding frequency.

It is also an embodiment that the at least one air flow characteristic of the boundary layer is represented by
an air flow velocity and/or
an air flow direction.

As an example, the air flow characteristic may be represented by a wind speed profile above the surface of the rotor blade at a specific position of the rotor blade or along the surface of the rotor blade.

The problem stated above is also solved by a sensor device being assignable to a rotor blade of a wind turbine and arranged such that a method as described herein is executable, comprising
at least one flexible element,
a measuring unit for capturing at least one movement of the least one flexible element,
a communication unit for providing at least one movement information representing the at least one captured movement.

The problem stated above may be also solved by a wind turbine comprising
at least one rotor blade,
at least one sensor device as described herein and being attached to or being a part of a surface of the at least one rotor blade,
a processing unit that is arranged for determining at least one characteristic of a boundary layer of the at least one rotor blade based on the at least one movement information provided by the sensor device.

The problem stated above is also solved by a device comprising and/or being associated with a processing unit and/or hard-wired circuit and/or a logic device that is arranged such that the method as described herein is executable thereon.

Said processing unit may comprise at least one of the following: a processor, a microcontroller, a hard-wired circuit, an ASIC, an FPGA, a logic device.

The solution provided herein further comprises a computer program product (non-transitory computer readable storage medium having instructions, which when executed by a processor, perform actions) directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

BRIEF DESCRIPTION

Some of the embodiments will be described in detail, with reference to the following figures, wherein like designations denote like members, wherein.

DETAILED DESCRIPTION

Measuring a Deflection of a Flexible Element

Figure 1:
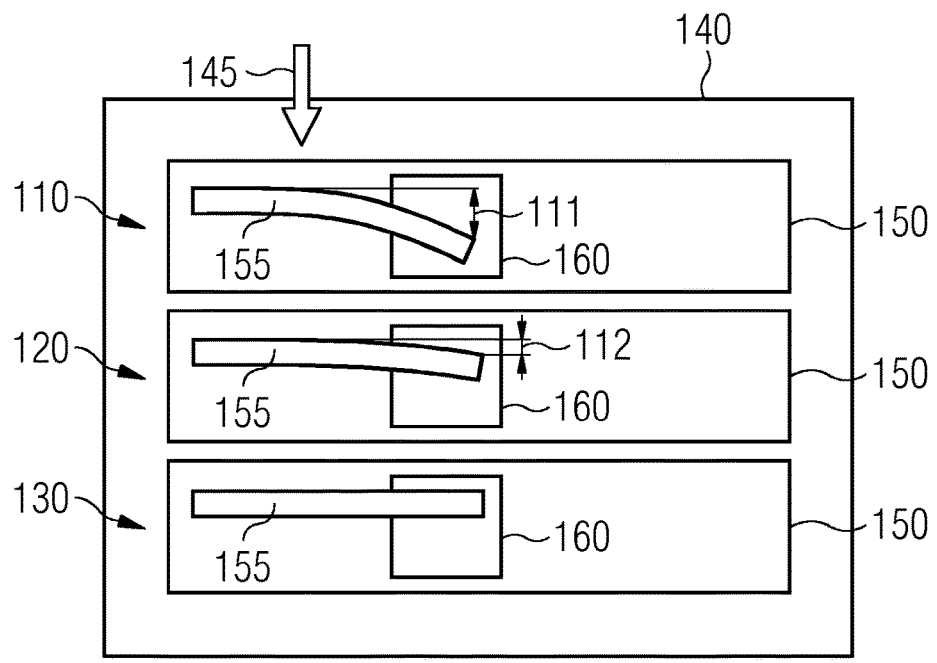
FIG. 1 shows in a schematic top view three possible scenarios of an exemplary embodiment of the proposed solution based a sensor arranged for capturing a deflection of a flexible element.

FIG. 1 shows in a schematic top view three possible scenarios 110, 120, 130 of an exemplary embodiments of the proposed solution based a sensor 150 arranged for capturing a deflection, in particular a bending of a flexible element 155. The sensor 150 comprises a detection unit suitable to measure or capture a quantity of a bending of the flexible element 155. The sensor 150 may be mounted on the surface of a rotor blade 140 in an effective range of the boundary layer wherein an incoming wind (indicated by an arrow 145), i.e. an air flow impinging at the rotor blade 140 is moving, i.e. deflecting or bending the flexible element 155 according to the direction of the incoming air flow 145.

According to the first scenario 110 representing a thin boundary layer the flexible element 155 will be more deflected (indicated by an arrow 111) due to higher local velocity of the air flow.

In contrast, as illustrated in the second scenario 120 the flexible element 155 is less deflected (indicated by an arrow 112) in case of a thick boundary layer resulting in a low air flow velocity.

No deflection will be determined in case of a missing impinging air flow as visualized in the third scenario 130.

Capturing the movement of the flexible element, in particular measuring the bending of the flexible element 155 may be exemplarily implemented by using a moving surface with a magnetic element being part of the flexible element 155 and by using a magnetic detector (as exemplarily indicated in FIG. 1 by a reference number 160) to determine the position of the magnetic element and thus the position of the flexible element 155.

Figure 2:
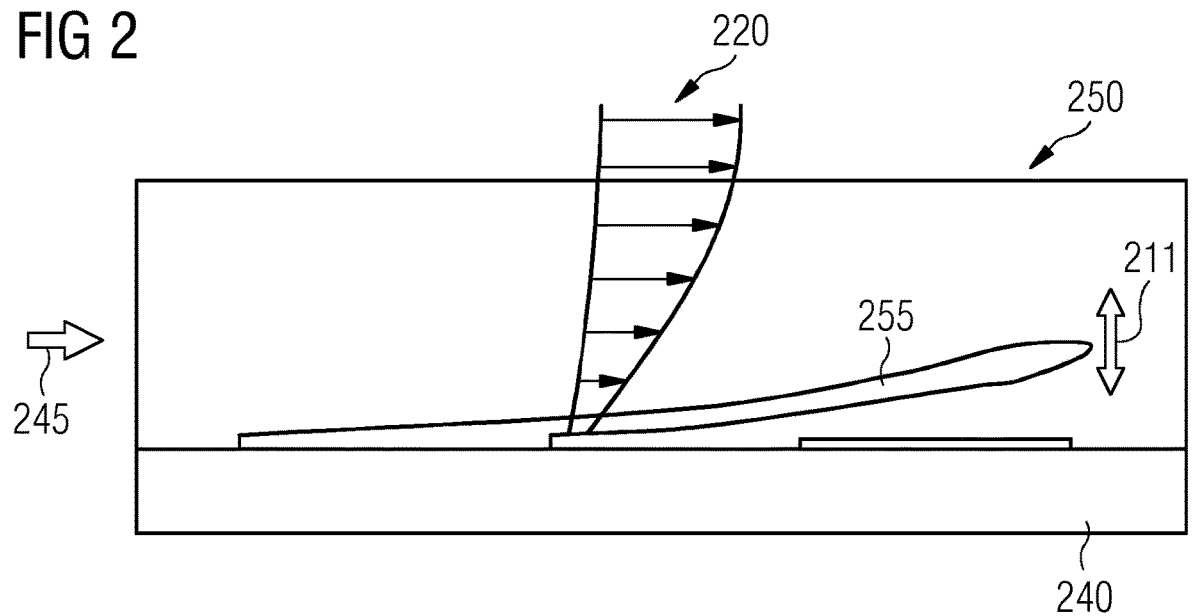
FIG. 2 shows in a schematic side view an alternative embodiment of the proposed solution.

Further possible options for capturing the movement of the flexible element would be based on at least one out of the following measurement scenarios:
  using strain gauge attached to the bending element;
  using a moving element on top of a surface of a capacitive sensor and using e.g. a tomographic approach to determine the position of the flexible element;
  using a conductive element moving on top of a conductive surface of the sensor thereby measuring a change in resistivity;
  using of small optical fibers to detect bending
  using a proximity sensor based on infrared FIG. 2 shows in a schematic side view an alternative embodiment of the proposed solution based a sensor 250 arranged such a way on the surface of a rotor blade 240 to capture a deflection or bending (indicated by an arrow 211) of a flexible element 255 in a direction perpendicular or substantially perpendicular to an impinging air flow (as indicated by an arrow 245). Dependent on characteristics of the boundary layer, i.e. dependent on a wind speed profile 220 and thus of the air flow velocity of the impinging air flow 245 a specific deflection or bending of the flexible element 255 will occur perpendicular to the incoming wind direction 245.

The measurement of the deflection or bending of the flexible element may be implemented on basis of the measurement scenarios already explained with respect to the measurement scenarios of FIG. 1.

Figure 3:
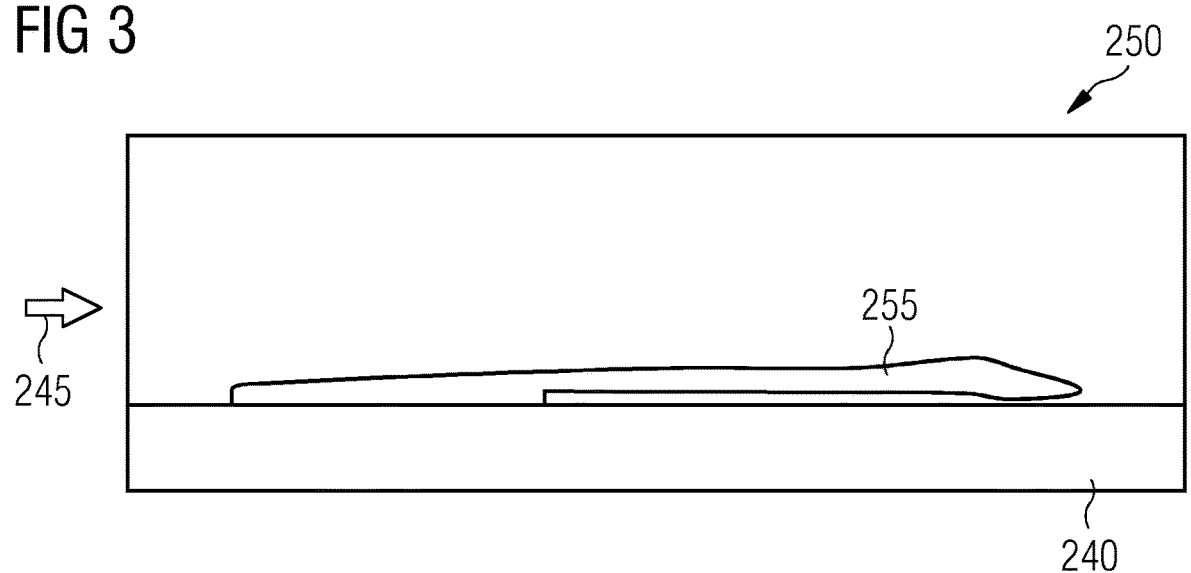
FIG. 3 shows a corresponding scenario of the sensor of FIG. 2.

FIG. 3 shows a corresponding scenario of the sensor 250 of FIG. 2 wherein the flexible element 255 is bent into the direction towards the surface of the rotor blade 240 according to an exemplary scenario with a thin boundary layer characterized by high air flow velocities near the surface of the rotor blade 240.

Measuring a Vortex Shedding Frequency of a Flexible Rigid Element or Body

A flow region behind a flexible element, in particular arranged as a bluff body (e.g. as a cylinder) may be characterized by a periodic arrangement of vortices. This flow region behind the body is referred to as a wake of the flow wherein the periodic arrangement of vortices may be also referred to as vortex street. Thereby, a frequency with which the vortices are shed from the body is dependent on the dimensions of the body like, e.g. a diameter of the cylinder and the velocity of the impinging air flow. The frequency may directly proportional to the velocity of the air flow and inversely proportional to the size of the cylinder.

Figure 4:
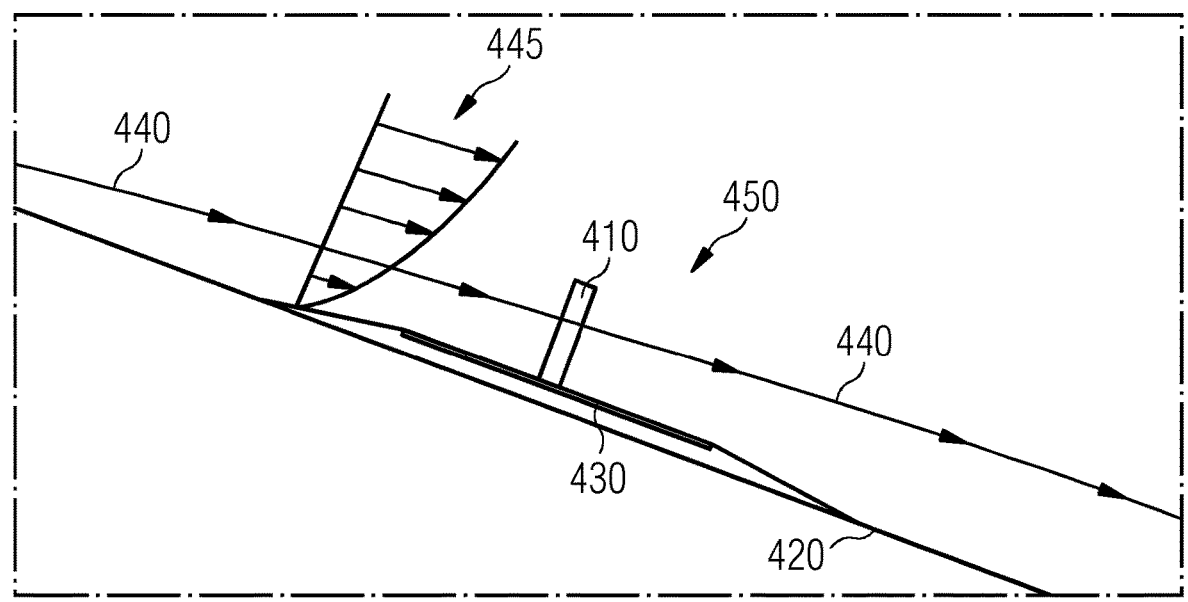
FIG. 4 shows in a schematic side view a first exemplary embodiment of a sensor using a cylinder as a bluff body according to the present invention.

FIG. 4 shows in a schematic side view a first exemplary embodiment of a sensor 400 using a cylinder 410 as a bluff body according to embodiments of the present invention. According to the scenario of FIG. 4 the orientation of the cylinder 410 is perpendicular to the surface of a rotor blade 420.

The cylinder 410 is in an operative connection with an accelerometer 430 representing a flexible element according to the proposed solution and being part of the sensor 450. The accelerometer 430 is capturing the movement of the cylinder 410 being excited with a certain vortex shedding frequency by an impinging air flow 440 characterized by an air flow profile 445. Due to the perpendicular orientation of the cylinder 410 the movements captured by the accelerometer 430 are mainly representing an integrated value of the air flow velocity which is similar to an average value of the air flow velocity. Based on the determined air flow velocity further characteristics of the boundary layer may be determined.

Figure 5:
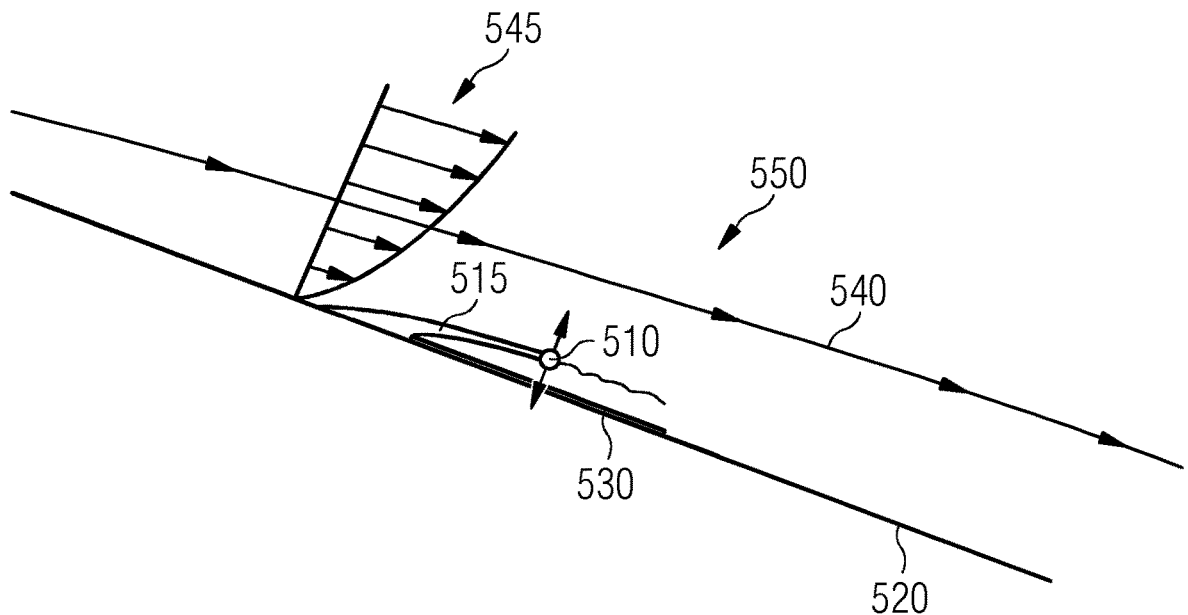
FIG. 5 shows in a schematic side view a second exemplary embodiment of a sensor of FIG. 4 using a cylinder as a bluff body being a part of a flexible holding.

FIG. 5 shows in a schematic side view a second exemplary embodiment of a sensor 550 using a cylinder 510 as a bluff body being a part of a flexible holding 515. In contrast to the scenario of FIG. 4, the orientation of the cylinder 510 is parallel to a surface of a rotor blade 520. Being excited by an impinging air flow 540 comprising a characterizing air flow profile 545 the cylinder 510 is oscillating (indicated by arrows) due to its connection to the flexible holding 515 in a direction perpendicular to the surface of the rotor blade 520 with a certain vortex shedding frequency. Due to its orientation parallel to the surface 520 of the rotor blade the cylinder 510 is mainly reacting to a local value of the air flow velocity at a given height within the boundary layer.

According to the exemplary embodiment of FIG. 5 the movement, i.e. vibration of the cylinder is captured by a capacitive element 530 being part of the sensor 550 and located at the surface of the rotor blade 520.

Figure 6:
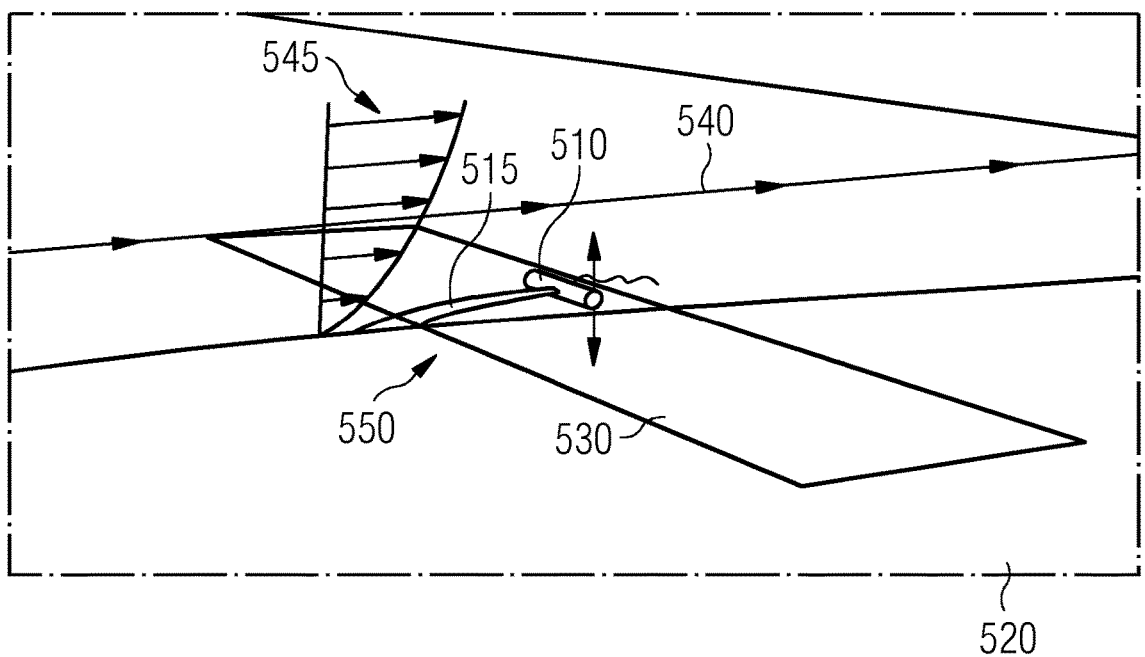
FIG. 6 shows in a perspective view the same sensor of FIG. 5.

Alternatively, instead of using an accelerometer (FIG. 4) or capacitive element (FIG. 5) the movement of the cylinder and thus the frequency of the excited cylinder may be measured by at least one out or the flowing measurement means which might be part of the sensor 550:
  a magnetic element on the surface of the rotor blade
  a proximity sensor on the surface of the rotor blade
  an optical fiber across the cylinder FIG. 6 shows in a perspective view the same sensor of FIG. 5 thereby using the same reference numbers.

Figure 7:
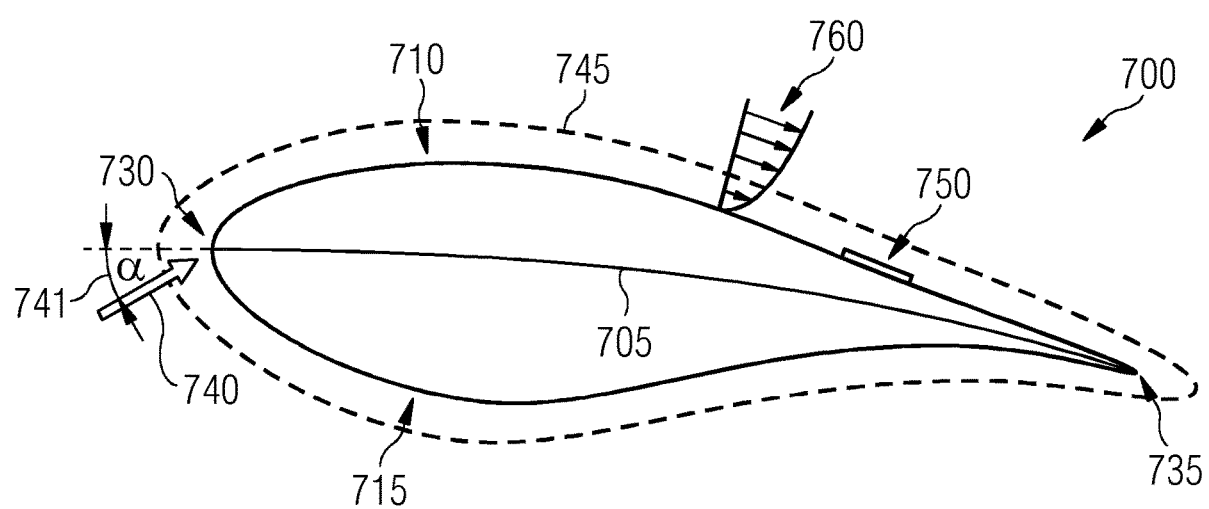
FIG. 7 illustrates a cross sectional view of a rotor blade which is also referred to as an airfoil of the rotor blade.

FIG. 7 illustrates a cross sectional view of a rotor blade 700 which is also referred to as an airfoil of the rotor blade. Thereby, a chord line 705 is connecting a leading edge 730 and a trailing edge 735 of the rotor blade 700. Furthermore, a surface of the rotor blade 700 is divided by the chord line 705 into an upper section which is referred to as a suction side 710 and a lower section which is also referred to as a pressure side 715.

According to the scenario of FIG. 7 an air flow 740 is impinging at the leading edge 730 of the rotor blade 700. The chord line 705 and a direction of a airflow 740 are defining an angle α (indicated by an arrow 741) which is also referred to as an angle of attack.

The velocity of the airflow 740 may approach a value of zero if measured close to the surface of the rotor blade 7000. In a direction perpendicular to the surface the velocity of the airflow increases. If the velocity of the airflow reaches a value of exemplarily 99% of the free air stream velocity, the so-called limit of a boundary layer (indicated by a dotted line 745) is reached. In other words, the thickness of the boundary layer 745 may be defined by the distance away from the surface of the rotor blade at which 99% of the free air stream velocity is reached—in FIG. 7 schematically illustrated by a respective wind speed profile 760. Typically, the thickness of the boundary layer 745 is in a range between a few millimeters and a few centimeters, for example up to 5 centimeters.

The thickness of the boundary layer 745 is not equal along the entire cross section of the rotor blade 700. According to one possible scenario the boundary layer is attached along the entire rotor blade from the leading edge 730 to the trailing edge 735.

In contrast to that, according to a further possible scenario under different conditions, the boundary layer may be detached at a certain chordwise position of the rotor blade 700, e.g. at a distance of 80% from the leading edge in relation to lengths of the suction side 710.

The sensor of the solution presented may be exemplarily installed on the surface of the suction side 710 of the rotor blade 700 at a defined chordwise position in relation to the leading edge as indicated by an arrow 750. As an example, such kind of sensor may be used for monitoring stall conditions at exact that chordwise position.

The proposed solution allows the determination of at least one characteristic of a boundary layer of the rotor blade during operation of the wind turbine on basis of a movement of a flexible element. Based on the captured characteristics operating conditions of the wind turbine like, e.g., a soiling state of the rotor blade, a blade surface degradation (erosion), an angle of attack of a given section of the rotor blade and/or a local stall detection may be derived allowing an effective control of the wind turbine under economical aspects.

Examples of such kind of effective control of a wind turbine may be
  adjusting an optimized operational mode of the wind turbine, in particular with an optimal setting of a soiled rotor blade;
  reporting a soiling state to an operator initialing, if necessary a blade washing;
  deriving vital information during a power curve campaign measurement;
  operating the wind turbine less aggressively reducing the risk of stall;
  operating the wind turbine less aggressively reducing noise emission The proposed solution allows an operation of the wind turbine with an optimized Annual Energy Production (AEP) in combination with lower loads resulting in an increased AEP/Loads ratio of the wind turbine which allows a further reduction of levelized Cost of Energy (LEOC). As a further advantage, more sophisticated control strategies may be enabled based on the proposed solution.

Possible embodiments of the present invention may be used, e.g. as soiling sensors, angel of attack sensors or stall detection sensors.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for determining at least one characteristic of a boundary layer of a wind turbine rotor blade, comprising:
    capturing at least one movement of at least one flexible element of at least one sensor being attached to or being part of a surface of the rotor blade, and
    determining the at least one characteristic of the boundary layer based on the at least one captured movement of the at least one flexible element,
    wherein the at least one characteristic of the boundary layer is determined based on an air flow characteristic of the boundary layer,
    wherein the at least one flexible element comprises a bluff body,
    wherein a vortex shedding frequency of the bluff body is determined on a basis of the captured movement, and
    wherein the air flow characteristic is determined on a basis of the determined vortex shedding frequency.

2. The method according to claim 1, wherein
    the at least one air flow characteristic of the boundary layer is represented by
    an air flow velocity, and/or
    an air flow direction.

3. A device comprising a processor unit configured to implement the method according to claim 1.

4. A computer program product, comprising a computer readable hardware storage device having computer readable program code stored therein, said program code executable by a processor of a computer system to implement the method according to claim 1.

5. A sensor device comprising:
    at least one flexible element comprising a bluff body, the at least one flexible element attached to or being a part of a surface of at least one rotor blade of a wind turbine,
    a measuring unit for capturing at least one movement of the least one flexible element and for determining a vortex shedding frequency of the bluff body on a basis of the captured movement, and
    a communication unit for providing at least one movement information representing the at least one captured movement of the at least one flexible element to a processing unit for determining at least one characteristic of a boundary layer of the at least one rotor blade, w herein the at least one characteristic of the boundary layer is determined based on an air flow characteristic of the boundary layer, w herein the air flow characteristic is determined on a basis of the determined vortex shedding frequency.

6. A wind turbine, comprising:
    at least one rotor blade,
    at least one sensor device attached to or being a part of a surface of the at least one rotor blade, wherein the at least one sensor device includes at least one flexible element including a bluff body, a measuring unit for capturing at least one movement of the least one flexible element, and a communication unit for providing at least one movement information representing the at least one captured movement of the at least one flexible element, and
    a processing unit that is arranged for determining at least one characteristic of a boundary layer of the at least one rotor blade based on the at least one movement information provided by the sensor device wherein the at least one characteristic of the boundary layer is determined based on an air flow characteristic of the boundary layer, wherein a vortex shedding frequency of the bluff body is determined on a basis of the captured movement, and wherein the air flow characteristic is determined on a basis of the determined vortex shedding frequency.

* * * * *